(12) United States Patent
Komeda et al.

(10) Patent No.: US 7,853,391 B2
(45) Date of Patent: Dec. 14, 2010

(54) ENERGY-SAVING DRIVING PROMOTION SYSTEM AND METHOD

(75) Inventors: Osamu Komeda, Mishima (JP); Akito Adachi, Susono (JP); Takeshi Yamada, Toyota (JP); Yukihiro Okane, Toyota (JP); Sadamu Tsuge, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 219 days.

(21) Appl. No.: 12/061,984

(22) Filed: Apr. 3, 2008

(65) Prior Publication Data

US 2008/0319601 A1   Dec. 25, 2008

(30) Foreign Application Priority Data

Apr. 3, 2007  (JP) .............................. 2007-097638

(51) Int. Cl.
  *G06F 19/00*  (2006.01)
  *G06G 7/70*  (2006.01)

(52) U.S. Cl. .......................... 701/99; 701/70; 701/101; 701/110; 701/123; 73/1.37; 73/488; 340/463; 340/467; 340/669

(58) Field of Classification Search .................. 701/29, 701/70, 99, 101, 110, 123; 73/1.37, 488; 340/463, 467, 669

See application file for complete search history.

(56) References Cited

U.S. PATENT DOCUMENTS 7,024,306 B2 *  4/2006  Minami et al. .............. 701/123
2006/0192533 A1 *  8/2006  Kimura et al. ................ 322/22
2007/0112475 A1 *  5/2007  Koebler et al. ................ 701/1
2009/0288636 A1 *  11/2009  Saito et al. .................. 123/399

FOREIGN PATENT DOCUMENTS

| JP | 2000-264093 A | 9/2000 |
| JP | 2003-220851 A | 8/2003 |
| JP | 2004-197647 A | 7/2004 |
| JP | 2006-022939 A | 1/2006 |
| JP | 2006-076415 A | 3/2006 |
| JP | 2006-347214 A | 12/2006 |

\* cited by examiner

*Primary Examiner*—Jack Keith
*Assistant Examiner*—Rami Khatib
(74) *Attorney, Agent, or Firm*—Sughrue Mion, PLLC

(57) ABSTRACT

An energy-saving driving promotion system includes: a vehicle state detecting device; a current value calculating device that calculates a current value associated with an accelerator operation amount or a vehicle drive power; a recommended value calculating device that calculates a recommended value associated with the accelerator operation amount or the vehicle drive power; an indicator device that indicates a relationship between the calculated recommended value and the calculated current value; and an acceleration intention determining device that determines whether a driver intends to accelerate. If the acceleration intention determining device determines that the driver intends to accelerate, the recommended value calculating device calculates a larger recommended value when the acceleration intention determining device determines that the driver intends to accelerate than when the acceleration intention determining device determines that the driver does not intend to accelerate.

2 Claims, 10 Drawing Sheets

FIG.4

| VEHICLE SPEED | ACCELERATOR OPERATION AMOUNT STANDARD VALUE ACC_std |
|---|---|
| 0km/h | A1 |
| 5km/h | A2 |
| 10km/h | A3 |
| 20km/h | A4 |
| 30km/h | A5 |
| 40km/h | A6 |
| 50km/h | A7 |
| 60km/h | A8 |
| 70km/h | A9 |
| 80km/h | A10 |
| 90km/h | A11 |
| 100km/h | A12 |
| 110km/h | A13 |
| 120km/h | A14 |
| 130km/h | A15 |
| 140km/h | A16 |
| 150km/h | A17 |
| 160km/h | A18 |
| 200km/h | A19 |
| EQUAL TO OR ABOVE 230km/h | A20 |

FIG. 5A

| VEHICLE SPEED | ECO ZONE UPPER LIMIT THRESHOLD (NORMAL DRIVING MODE) |
|---|---|
| 0km/h | B1 |
| 5km/h | B2 |
| 10km/h | B3 |
| 20km/h | B4 |
| 30km/h | B5 |
| 40km/h | B6 |
| 50km/h | B7 |
| 60km/h | B8 |
| 70km/h | B9 |
| 80km/h | B10 |
| 90km/h | B11 |
| 100km/h | B12 |
| 110km/h | B13 |
| 120km/h | B14 |
| 130km/h | B15 |
| 140km/h | B16 |
| 150km/h | B17 |
| 160km/h | B18 |
| 200km/h | B19 |
| EQUAL TO OR ABOVE 230km/h | B20 |

FIG. 5B

| VEHICLE SPEED | ECO ZONE UPPER LIMIT THRESHOLD (ACCELERATION/HILL-CLIMBING MODE) |
|---|---|
| 0km/h | C1 |
| 5km/h | C2 |
| 10km/h | C3 |
| 20km/h | C4 |
| 30km/h | C5 |
| 40km/h | C6 |
| 50km/h | C7 |
| 60km/h | C8 |
| 70km/h | C9 |
| 80km/h | C10 |
| 90km/h | C11 |
| 100km/h | C12 |
| 110km/h | C13 |
| 120km/h | C14 |
| 130km/h | C15 |
| 140km/h | C16 |
| 150km/h | C17 |
| 160km/h | C18 |
| 200km/h | C19 |
| EQUAL TO OR ABOVE 230km/h | C20 |

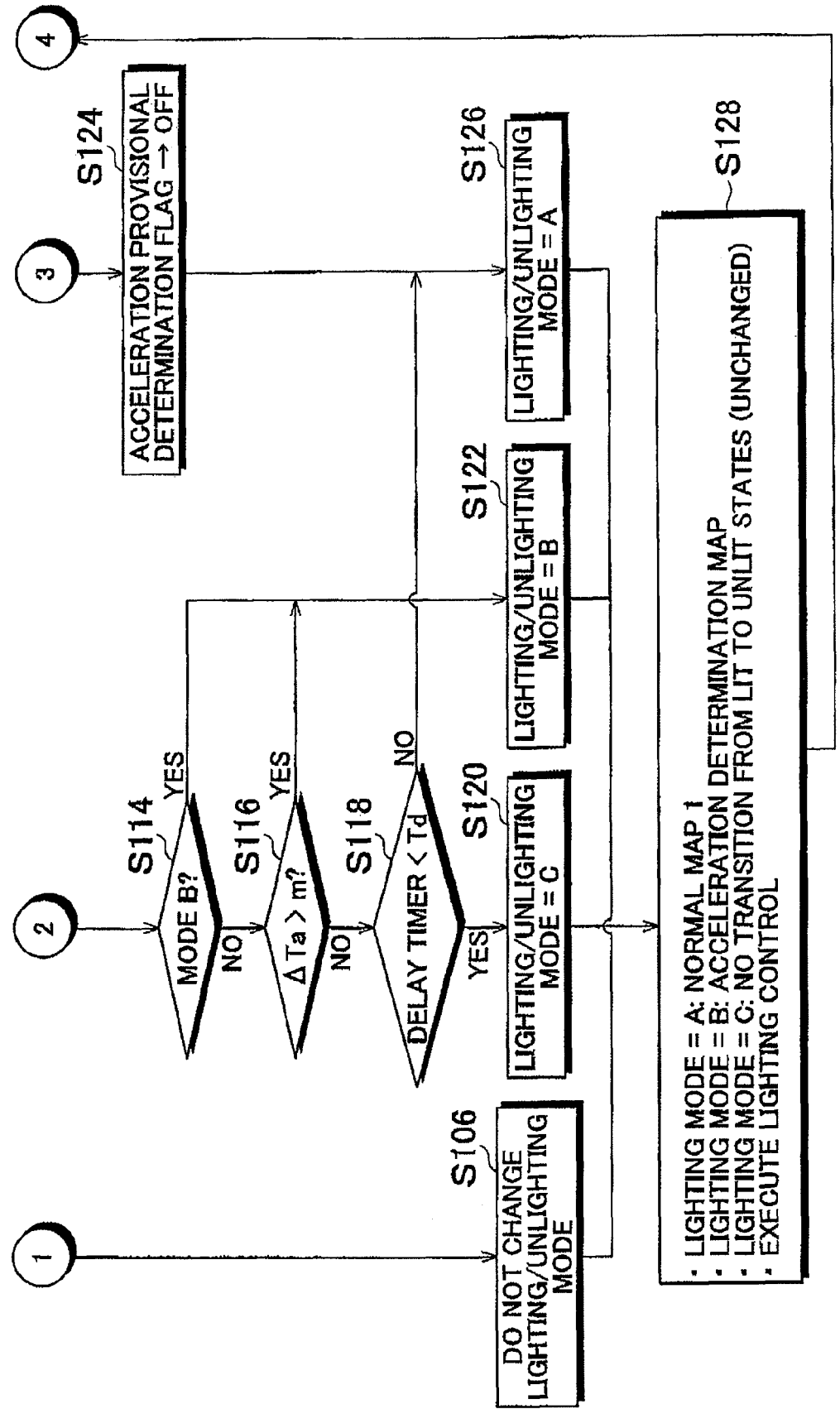

ENERGY-SAVING DRIVING PROMOTION SYSTEM AND METHOD

INCORPORATION BY REFERENCE

The disclosure of Japanese Patent Application No. 2007-097638 filed on Apr. 3, 2007 including the specification, drawings and abstract is incorporated herein by reference in its entirety.

BACKGROUND OF THE INVENTION

1. Field of the Invention

The present invention relates to an energy-saving driving promotion system and a method of promoting environmentally-friendly energy-saving driving.

2. Description of the Related Art

In the related art, fuel-saving driving evaluation systems for a vehicle are known that include an engine speed sensor that measures the engine speed of a vehicle; an accelerator operation amount sensor that measures the accelerator operation amount; a vehicle speed sensor that measures the vehicle speed; a fuel flow rate sensor that measures the flow rate of fuel; an engine load sensor that measures the engine load; and a control device that computes the amount of fuel consumed by the vehicle, and the acceleration, deceleration, and travel distance of the vehicle from the measured engine speed, accelerator operation amount, vehicle speed, fuel flow rate, and engine load. The control device displays a warning against excessive depression of the accelerator and/or emits a voice warning to similar effect if the accelerator operation amount, engine load, and acceleration are equal to or exceed predetermined values, the vehicle is not determined to be going up a hill, and an indication prompting an upshift is not being displayed (for example, see JP-A-2006-76415).

According to the invention described in JP-A-2006-76415, a display warning against excessive depression of the accelerator is not output if the vehicle is driving uphill, which means that environmentally-friendly, energy-saving driving cannot be promoted during that period.

SUMMARY OF THE INVENTION

The present invention provides an energy-saving driving promotion system and method to promote energy-saving driving in an appropriate manner in accordance with whether the driver intends to accelerate.

A first aspect of the present invention relates to an energy-saving driving promotion system including: a vehicle state detecting device that detects a vehicle state; a current value calculating device that calculates a current value associated with an accelerator operation amount or a vehicle drive power, on the basis of the detected vehicle state; a recommended value calculating device that calculates a recommended value associated with the accelerator operation amount or the vehicle drive power, on the basis of the detected vehicle state; an indicator device that indicates a relationship between the calculated recommended value and the calculated current value; and an acceleration intention determining device that determines whether a driver intends to accelerate, based on the detected vehicle state. If the acceleration intention determining device determines that the driver intends to accelerate, the recommended value calculating device calculates a larger recommended value when the acceleration intention determining device determines that the driver intends to accelerate than when the acceleration intention determining device determines that the driver does not intend to accelerate.

According to a second aspect of the present invention, the energy-saving driving promotion system according to the first aspect of the present invention may further include a storage device that stores a first map, which defines a relationship between vehicle speed and the recommended value, and a second map, which defines a relationship between vehicle speed and the recommended value. The recommended value in the second map is larger than the recommended value in the first map for any given vehicle speed. If the acceleration intention determining device determines that the driver does not intend to accelerate, the recommended value calculating device calculates the recommended value using the first map, and if the acceleration intention determining device determines that the driver intends to accelerate, the recommended value calculating device calculates the recommended value using the second map.

According to a third aspect of the present invention, the energy-saving driving promotion system according to the first or second aspect of the present invention may further include an uphill driving determining device that determines whether the vehicle is driving uphill. If the uphill driving determining device determines that the vehicle is driving uphill, the acceleration intention determining device then determines that the driver intends to accelerate.

According to a fourth aspect of the present invention, the energy-saving driving promotion system according to the first or second aspect of the present invention further includes an overtake driving determining device that determines whether a vehicle is overtaking a preceding vehicle, and the acceleration intention determining device determines that the driver intends to accelerate if the overtake driving determining device determines that the vehicle is overtaking.

According to a fifth aspect of the present invention, the energy-saving driving promotion system according to the first or second aspect of the present invention may further include an index value calculating device that calculates an index value indicating a driver's intention to accelerate, and the acceleration intention determining device determines that the driver intends to accelerate if the calculated index value exceeds a predetermined first threshold.

According to a sixth aspect of the present invention, in the energy-saving driving promotion system according to the fifth aspect of the present invention, the indicator device may be a lamp used to indicate whether the calculated current value exceeds the calculated recommended value, the energy-saving driving promotion system may further include a provisional determination device that provisionally determines that the driver intends to accelerate if the calculated index value exceeds a second threshold that is smaller than the first threshold. If the provisional determination device provisionally determines that the driver intends to accelerate, the lamp may remain in its current state for a predetermined period of time.

According to a seventh aspect of the present invention, in the energy-saving driving promotion system according to the sixth aspect of the present invention, the lamp changes its current state, even if the provisional determination device provisionally determines that the driver intends to accelerate, if the acceleration intention determining device determines, within the predetermined period of time, that the driver intends to accelerate, and the calculated recommended value exceeds the calculated current value.

Another aspect of the present invention relates to an energy-saving driving promotion method that includes: detecting a vehicle state; calculating a current value associated with an accelerator operation amount or a vehicle drive power, based on the detected vehicle state; calculating a recommended value associated with the accelerator operation amount or the vehicle drive power, based on the detected vehicle state; indicating a relationship between the calculated recommended value and the calculated current value; and determining whether the driver intends to accelerate, based on the detected vehicle state. If it is determined that the driver intends to accelerate, a larger recommended value is calculated when it is determined that the driver intends to accelerate than when it is determined that the driver does not intend to accelerate.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is a diagram showing an example of a map that defines a relationship between accelerator operation amount standard value ACC_std and vehicle speed;

FIG. 5A is a table representing a relationship between Eco Zone upper limit threshold and vehicle speed during a normal driving mode;

FIG. 5B is a table representing the relationship between Eco Zone upper limit threshold and vehicle speed during an acceleration/hill-climbing mode;

FIG. 7A and FIG. 7B are flowcharts showing main processes executed by a meter ECU of an energy-saving driving promotion system according to the second embodiment of the present invention;

DETAILED DESCRIPTION OF EMBODIMENTS

Figure 1:
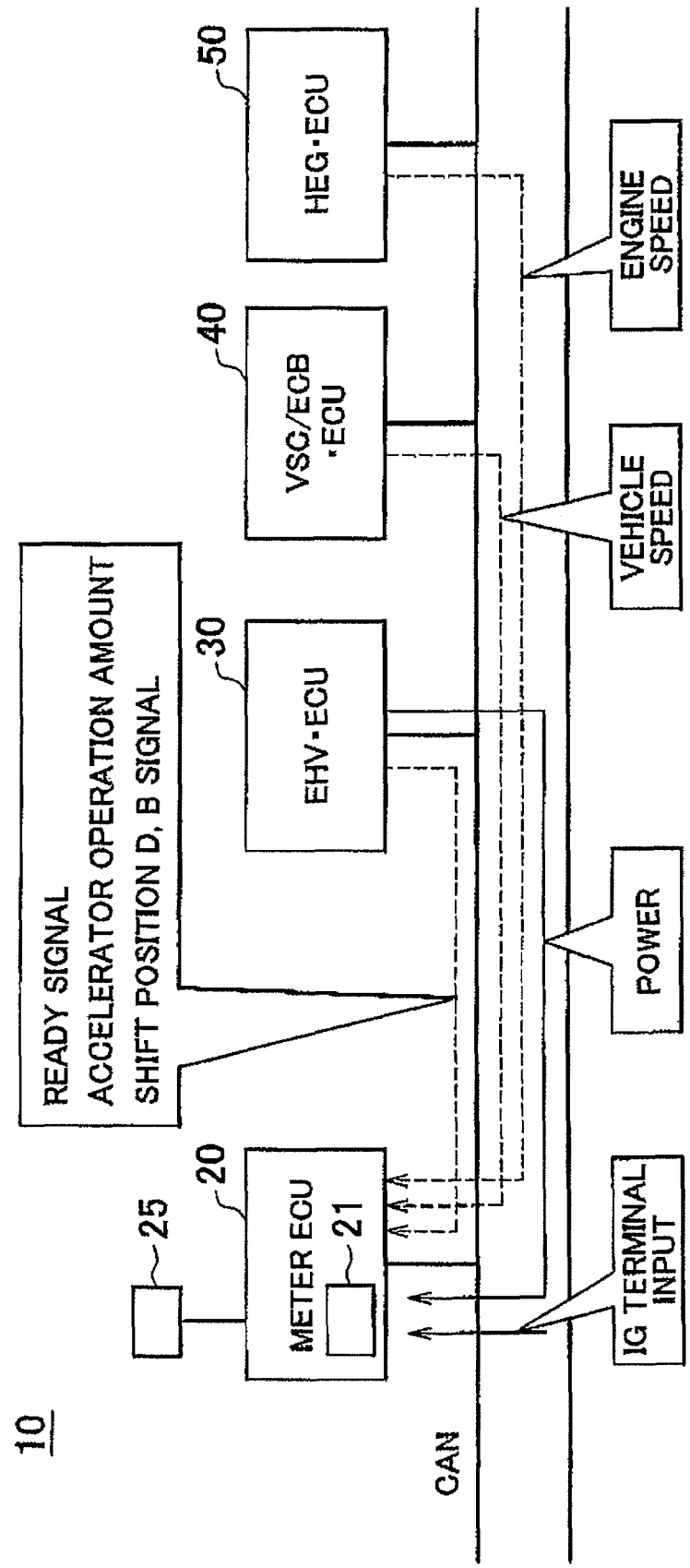
FIG. 1 is a system configuration diagram showing the main configuration of an energy-saving driving promotion system according to the first embodiment of the present invention.

FIG. 1 is a system configuration diagram showing the main configuration of an energy-saving driving promotion system 10 according to the first embodiment of the present invention. The following description will be directed to a case where the energy-saving driving promotion system 10 according to this embodiment is configured for a hybrid vehicle.

The energy-saving driving promotion system 10 according to this embodiment includes a meter ECU 20, an electric hybrid vehicle (EHV)-ECU 30, a vehicle stability control/electrically-controlled brake (VSC/ECB)-ECU 40, and an HEG-ECU 50.

Each ECU 20, 30, 40, and 50 is configured by a microcomputer and includes, for example, a CPU, ROM for storing a control program, a readable and writable RAM for storing computation results, a timer, a counter, an input interface, and an output interface. Also, the ECUs 20, 30, 40, and 50 are connected to each other via a suitable communication line such as controller area network (CAN).

Connected to the meter ECU 20 is a display section 25 that is set within the meter. The display state of the display section 25 is controlled by the meter ECU 20.

As schematically shown in FIG. 1, various signals that indicate the vehicle state (hereinafter, also referred to as "vehicle state signals") are input to the meter ECU 20 from the respective ECUs 30, 40, and 50. In addition, a signal that indicates the state of an ignition switch may also be input to the meter ECU 20 (IG terminal input).

The vehicle state signals include a "ready" signal, an accelerator operation amount signal, and shift position signals (D, B signals) which are supplied from the EHV-ECU 30. The "ready" signal is output when a motor generator (not shown) constituting a vehicle drive source is shifted to a ready state (preparation complete state). The accelerator operation amount may be the depression stroke amount of an accelerator pedal detected by an accelerator operation amount sensor (not shown), or may be detected by a throttle opening sensor (not shown). The shift position may be detected by a shift position sensor (not shown). D, B signals are signals indicating that the current shift positions are in the D range and B range, respectively. It should be noted that B range refers to a range in which the gear shift ranges corresponding to those of the D range (drive range), in which a gear shift control to attain the maximum fuel efficiency characteristics and drivability is normally carried out, are set lower. When the accelerator is not depressed in the B range, a regenerative braking force due to the motor generator is obtained.

Vehicle state signals include a signal that indicates the vehicle speed supplied from the VSC/ECB-ECU 40, and a signal (Ne) that indicates the engine speed from the HEG-ECU 50. It should be noted that a wheel speed sensor (not shown) may be used to detect the vehicle speed.

Signals input to the meter ECU 20 include a signal that indicates the current power and that is supplied from the EHV-ECU 30 (hereinafter, referred to as "current power signal"). As shown in FIG. 1, the current power signal may be supplied to the meter ECU 20 via a communication line other than the CAN. The current power is the current value of the power of the vehicle's drive source (in this example, the sum of the current value of the engine power and the current value of the power of the motor generator), and corresponds to the current value of the wheel drive power. It should be noted that the current value of the power is calculated by the EHV-ECU 30. The current value of the engine power may be calculated based on the product of the current value of the engine speed and the current value of torque. Torque may be calculated based on the relationship between the current value of the intake air amount of the engine and the current value of the engine speed. The current value of the power of the motor generator may be calculated, for example, based on the product of the current value of the electrical current of the battery and the current value of the voltage thereof. It should be noted that the current power might be derived via a filter based on the present value and the previous value. The current power signal may indicate the current value of a control target value (target power) generated by the EHV-ECU 30.

Figure 2:
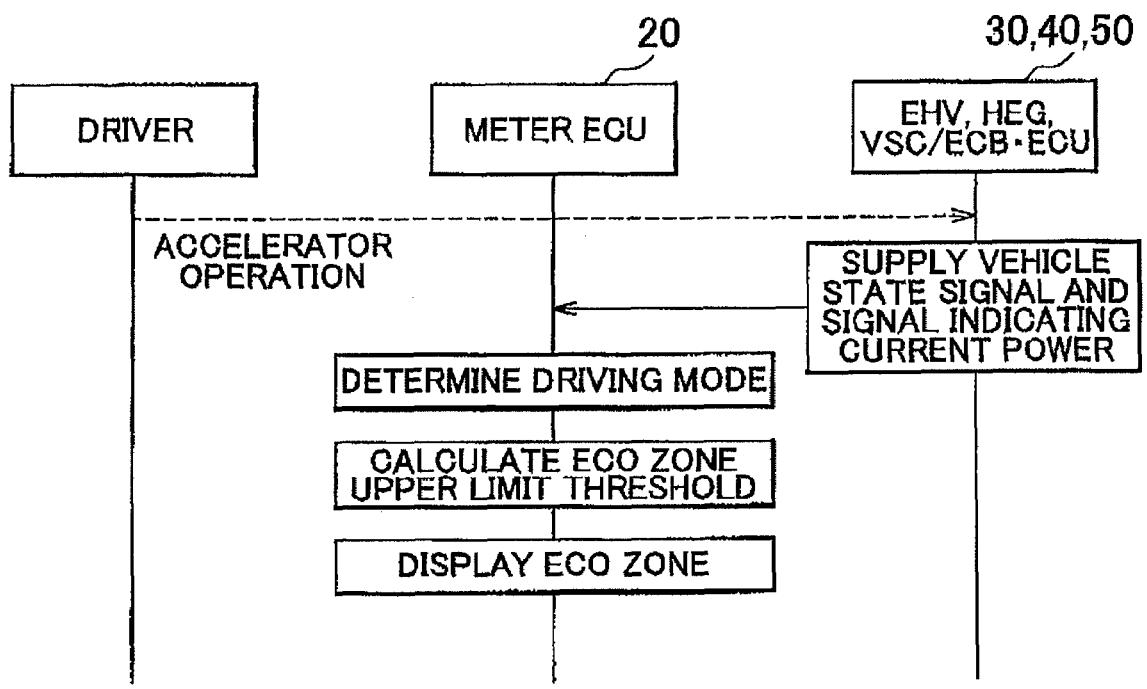
FIG. 2 is a diagram showing the sequence of main processes executed by the energy-saving driving promotion system according to the first embodiment.

FIG. 2 is a diagram showing the sequence of main processes executed by the energy-saving driving promotion system 10 according to this embodiment.

As shown in FIG. 2, when an accelerator operation is executed by the driver, the above-described vehicle state signals and the current power signal are input as required (at predetermined intervals) to the meter ECU 20 from the ECUs

30, 40, and 50. Based on the vehicle state signals and the current power signal that is input as required, the meter ECU 20 executes a driving mode determining process, an Eco Zone upper limit threshold calculating process, and an Eco Zone display process. In the following, these processes will be described in order in detail.

Figure 3:
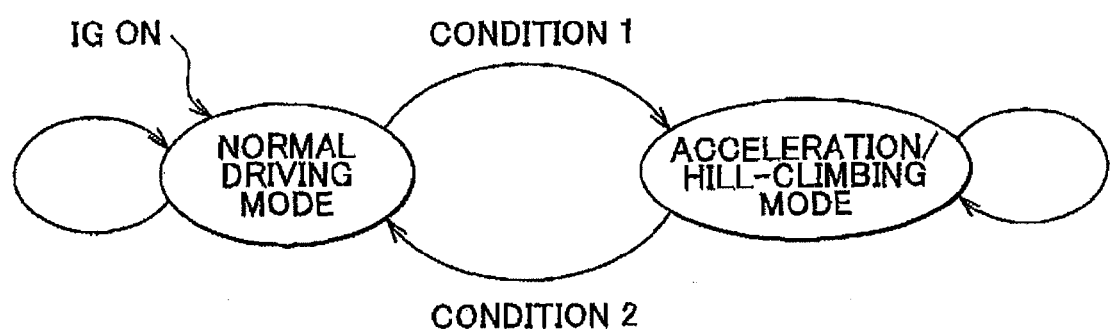
FIG. 3 is a diagram showing transition determining conditions (state transition diagram) in a driving mode determining process.

FIG. 3 is a diagram showing transition determining conditions (state transition diagram) in the driving mode determining process.

As shown in FIG. 3, driving modes include a normal driving mode and an acceleration/hill-climbing mode. The operational driving mode switches between these two modes. When the ignition switch is turned on, the operation starts in the normal driving mode. Transition condition 1 for the transition from the normal driving mode to the acceleration/hill-climbing mode is met when the driver intends to accelerate, which may be when, for example, the following condition (1), and condition (2) or condition (3) are met: (1) the shift position is in D range or B range; (2) ACC_fil(k)>ACC_std, and ACC_fil(k)≧ACC_fil(k−1)+α1×update cycle Ta are satisfied; and (3) ACC_fil(k)>ACC_std, and VEL_fil(k)≦VEL_fil(k−1)+α2×update cycle Tv are satisfied. Here, (k) represents the present value, and (k−1) represents the previous value. ACC_fil represents the latest accelerator operation amount [%] after filtering, and the temporary delay constant of the filter may be, for example 100 ms. The update cycle Ta may be, for example, 60 ms. VEL_fil represents the latest vehicle speed after filtering, and the temporary delay constant of the filter may be 100 ms. The update cycle Tv may be, for example, 60 ms. α1 and α2 are suitable constants (for example, 0 and 1, respectively).

ACC_std represents a standard accelerator operation amount [%]. The standard accelerator operation amount ACC_std is determined in advance in accordance with a vehicle speed and is the accelerator operation amount for a given vehicle speed (i.e., the accelerator operation amount sufficient to maintain a given vehicle speed without causing acceleration). The relationship between the standard accelerator operation amount ACC_std and the vehicle speed may be stored in a predetermined memory 21 in the form of a map shown in FIG. 4, for example. It should be noted that in the example shown in FIG. 4, the standard accelerator operation amount ACC_std (A1 to A20) is defined for every discrete vehicle speed (vehicle speed mainly in increments of 10 km/h). In FIG. 4, A1 to A20 are values within a range of, for example, 20% to 30%, and increase as the value of "*" of A* increases. However, as in a case where, for example, A1 to A8 are the same value, not all the values of A1 to A20 need to be different. It should be noted that if the current vehicle speed does not match the vehicle speed shown in FIG. 4, the standard accelerator operation amount ACC_std may be interpolated instead. For example, in the normal driving mode, if the current vehicle speed is maintained at 58 km/h using the standard accelerator operation amount ACC_std A7 corresponding to a vehicle speed of 50 km/h, and a standard accelerator operation amount ACC_std A8 corresponding to a vehicle speed of 60 km/h, the accelerator operation amount standard value A' corresponding to a vehicle speed of 58 km/h may be calculated by the following calculation formula, A'=A7+(A8−A7)×(60−50)/(58−50). A transition condition 2 for the transition from the acceleration/hill-climbing mode to the normal driving mode is met if the driver does not intend to accelerate, which occurs, for example, when the following condition (4) and condition (5) are met: (4) ACC_fil(k)≦ACC_std is satisfied; and (5) VEL_fil(k)≦α3 is satisfied. Here, α3 is a suitable constant (for example, 2).

The transition condition 1 for the transition from the normal driving mode to the acceleration/hill-climbing mode is set to be satisfied when the vehicle drives uphill, and when the vehicle overtakes a preceding vehicle. However, it may be determined more intentionally whether the vehicle is driving uphill, and whether the vehicle is overtaking a forward. In this case, if it is determined that the vehicle is driving uphill, or if it is determined that the vehicle is overtaking a preceding vehicle, it is determined that the driver intends to accelerate, so a transition from the normal driving mode to the acceleration/hill-climbing mode is executed. The determination as to whether a vehicle is driving uphill may be based on, for example, an inclination sensor (acceleration sensor), or map data (road gradient data) and the host vehicle position information from a navigation system. Alternatively, the determination as to whether the vehicle is driving uphill may be made based on whether the vehicle has straddled a thick broken line paint (an uphill lane marker), based on the results of the recognition process of road dividing lines in the image of a road in rear of the vehicle which is captured by a rear view camera. Further, the determination as to whether the vehicle is overtaking a preceding vehicle may be made based on the image-recognition results of an on-board camera (image-recognition results of road dividing lines), or the map data (lane information) and the host vehicle position information in the navigation system. Alternatively, it may be determined that a vehicle is overtaking if a direction indicator, which indicates change of lanes to a passing lane, outputs a signal when the vehicle speed is not decreasing.

Although the transition from the normal driving mode to the acceleration/hill-climbing mode may be executed immediately when transition condition 1 for the transition from the normal driving mode to the acceleration/hill-climbing mode is satisfied, the transition is preferably executed when transition condition 1 has been maintained for a fixed period of time. Likewise, although the transition from the acceleration/hill-climbing mode to the normal driving mode may be executed immediately when transition condition 2 for the transition from the acceleration/hill-climbing mode to the normal driving mode is satisfied, the transition is preferably executed when transition condition 2 has been maintained for a fixed period of time.

An Eco Zone upper limit threshold represents the maximum allowable power for environmentally-friendly energy-saving driving. The Eco Zone upper limit threshold is determined in a manner that varies in accordance with the driving mode determined by the driving mode determining process described above. That is, although the Eco Zone upper limit threshold is determined in accordance with the vehicle speed irrespective of the driving mode, under the condition of the same vehicle speed, the Eco Zone upper limit threshold during the acceleration/hill-climbing mode is set to a value larger than the Eco Zone upper limit threshold during the normal driving mode. The relationship between the Eco Zone upper limit threshold and the vehicle speed is stored in the predetermined memory 21 (see FIG. 1) in the format shown in FIGS. 5A and 5B described below, for example.

FIG. 5A shows an example of a map illustrating the relationship between the Eco Zone upper limit threshold [kW] and the vehicle speed in the normal driving mode. FIG. 5B shows an example of a map illustrating the relationship between the Eco Zone upper limit threshold [kW] and the vehicle speed in the acceleration/hill-climbing mode.

The Eco Zone upper limit threshold (for example, B1 to B13) during the normal driving mode, when the vehicle speed is in low and intermediate-speed ranges, is set so that the Eco Zone upper limit threshold corresponds to a power that does not cause a decrease in power train efficiency (so as to fall below the maximum allowable power that does not cause a decrease in power train efficiency). In this case, the maximum allowable power depends on the characteristics of power train elements such as the engine, motor generator, transmission, and battery, thus a value derived in advance through testing or calculation by taking these characteristics into account may be used. Further, if the statistical traffic flow can be obtained in advance for a particular destination, the Eco Zone upper limit threshold during the normal driving mode may be determined by also taking the vehicle traffic into account. This is because even a power that does not cause a decrease in power train efficiency may be excessive for the surrounding vehicle traffic flow. Accordingly, if the vehicle is heading for a destination where the vehicle density is relatively high and congestion is frequent, less power than the allowable power-limit power may be set as the Eco Zone upper limit threshold. On the other hand, if the vehicle is heading for a destination where the vehicle density is relatively low and congestion rarely occurs, the maximum allowable power may be set as the Eco Zone upper limit threshold. Alternatively, a map such as one shown in FIG. 5A may be prepared for each particular driving environment such as city driving, highway driving, or congested zone driving, with the map being switched to match the present driving environment.

On the other hand, the Eco Zone upper limit threshold (for example, B14 to B20) during the normal driving mode when the vehicle speed is in a high-speed range is determined in such a way that the Eco Zone upper limit threshold corresponds to a power that suppresses acceleration. It should be noted that B1 to B20 are values within a range of, for example, 2 kW to 50 kW, and increase as the value of "*" of B* increases. However, as in a case where, for example, B14 to B20 are the same value, not all the values of B1 to B20 need to be different.

The Eco Zone upper limit threshold (for example, C1 to C13) during the acceleration/hill-climbing mode, when the vehicle speed is in low and intermediate-speed ranges, is set so that the Eco Zone upper limit threshold corresponds to a power that ensures that the current vehicle speed is maintained and the vehicle can ascend an uphill gradient of +1%. Accordingly, the Eco Zone upper limit threshold (for example, C1 to C13) during the acceleration/hill-climbing mode when the vehicle speed is in low and intermediate-speed ranges is larger than the Eco Zone upper limit threshold (for example, B1 to B13) during the normal driving mode, for a given vehicle speed. For example, the Eco Zone-upper limit threshold C5 during the acceleration/hill-climbing mode when the vehicle speed is 30 km/h is larger than the Eco Zone upper limit threshold B5 during the normal driving mode when the vehicle speed is 30 km/h. On the other hand, the Eco Zone upper limit threshold (for example, C14 to C20) during the acceleration/hill-climbing mode when the vehicle speed is in a high-speed range is set so that the Eco Zone upper limit threshold corresponds to a power that suppresses acceleration. Accordingly, the Eco Zone upper limit threshold (for example, C14 to C20) during the acceleration/hill-climbing mode when the vehicle speed is in a high-speed range may be the same value as the Eco Zone upper limit threshold (for example, B1 to B13) during the normal driving mode, with respect to the corresponding vehicle speed. It should be noted that the Eco Zone upper limit threshold C1 to C20 during the acceleration/hill-climbing mode are values within a range of, for example, 15 kW to 50 kW, and increases as the value of "*" of C* increases. However, as in a case where, for example, C14 to C20 are the same value, not all the values of C1 to C20 need to be different.

In the example shown in each of FIGS. 5A and 5B, when in the normal driving mode, the meter ECU 20 calculates an Eco Zone upper limit threshold corresponding to the current vehicle speed using the map shown in FIG. 5A stored in the memory 21, and in the acceleration/hill-climbing mode, the meter ECU 20 calculates an Eco Zone upper limit threshold corresponding to the current vehicle speed using the map shown in FIG. 5B stored in the memory 21. If the current vehicle speed does not accurately match the vehicle speed shown in FIGS. 5A and 5B, the Eco Zone upper limit threshold may be calculated by linear interpolation. For example, if the current vehicle speed is 58 km/h, during normal driving mode by using the Eco Zone upper limit threshold B7 corresponding to a vehicle speed of 50 km/h, and an Eco Zone upper limit threshold B8 corresponding to a vehicle speed of 60 km/h, an Eco Zone upper limit threshold B' corresponding to a vehicle speed of 58 km/h may be calculated by the following formula: B'=B7+(B8−B7)×(60−50)/(58−50). Further, if the present value of the current vehicle speed has not changed much from the previous value, the meter ECU 20 may maintain the previous value of the Eco Zone upper limit threshold. It is thus possible to calculate an appropriate Eco Zone upper limit threshold by removing the influence of noise of the vehicle speed sensor.

When information on the surrounding environment of the vehicle is acquired in real time by, for example, the on-board camera, an on-board sensor such as a radar, road-to-vehicle communication (including communication with the center), vehicle-to-vehicle communications or the like, the meter ECU 20 may correct the Eco Zone upper limit threshold during the normal driving mode in accordance with the vehicle's surrounding environment. For example, if the current vehicle speed is 30 km/h and will be maintained, in relation to another vehicle (including a group of vehicles) driving ahead, and a braking operation will become necessary within a short period of time, the Eco Zone upper limit threshold B4 corresponding to the vehicle speed of 20 km/h may be set as the final Eco Zone upper limit threshold. Conversely, if the current vehicle speed is 30 km/h, and the speed of the traffic flow surrounding (or ahead of) the vehicle is 40 km/h, the Eco Zone upper limit threshold B6 corresponding to the vehicle speed of 40 km/h may be set as the final Eco Zone upper limit threshold. Alternatively, in this case, an acceleration G required for achieving a vehicle speed of 40 km/h within a predetermined period of time may be calculated, and a power P″ to achieve this calculated acceleration G may be added to the Eco Zone upper limit threshold B5 corresponding to a vehicle speed of 30 km/h to thereby calculate the final Eco Zone upper limit threshold (=B5+P″). The power P″ may also be calculated by, for example, m×G×V. Here, m represents a vehicle mass, and V represents the current vehicle speed.

If the gradient of the road being currently driven on may be calculated based on, for example, an inclination sensor (acceleration sensor), or the map data (road gradient data) and the vehicle position information in the navigation system, the meter ECU 20 may correct the Eco Zone upper limit threshold during the acceleration/hill-climbing mode in accordance with the road gradient. For example, if the current vehicle speed is 30 km/h, and the gradient of the road being currently driven on is +3%, power P' corresponding to an increase in gradient of +2% may be calculated, and the power P' may be added to the Eco Zone upper limit threshold C5 corresponding to the vehicle speed of 30 km/h to thereby calculate the final Eco Zone upper limit threshold (=C5+P'). The power P' corresponding to the 2% increase may also be calculated by, for example, m×g×sin θ×V. Here, m represents the vehicle mass, g represents the acceleration of gravity, θ represents an angle corresponding to the gradient of +2%, and V represents the current vehicle speed.

If the road gradient is a downhill gradient, the meter ECU 20 may correct the Eco Zone upper limit threshold during the normal driving mode and the Eco Zone upper limit threshold during the acceleration/hill-climbing mode in accordance with the road gradient. If the current vehicle speed is 30 km/h, and the gradient of the road being currently driven on is −2%, a power corresponding to a decrease in gradient of −2% may be calculated, and the power may be subtracted from the Eco Zone upper limit threshold B5 or C5 corresponding to a vehicle speed of 30 km/h to thereby calculate the final Eco Zone upper limit threshold.

The meter ECU 20 may change the Eco Zone upper limit value gradually during the transition between the normal driving mode and the acceleration/hill-climbing mode. Accordingly, when transitioning from the normal driving mode and the acceleration/hill-climbing mode, five LEDs 22*a* to 22*e* will turn on or turn off one by one (that is, two or more LEDs are prevented from turning on or turning off simultaneously), thereby enhancing the appearance of lighting control. In this case, for example, the Eco Zone upper limit threshold may be gradually changed at a predetermined rate 71 (kW/s) when transitioning from the normal driving mode to the acceleration/hill-climbing mode, and the Eco Zone upper limit threshold may be gradually changed at a predetermined rate γ2 (kW/s) when transitioning from the acceleration/hill-climbing mode to the normal driving mode. In this case, the predetermined rates may be set as γ1>γ2 so that the gradual change is faster when transitioning from the normal driving mode to the acceleration/hill-climbing mode than when transitioning from the acceleration/hill-climbing mode to the normal driving mode.

Figure 6:
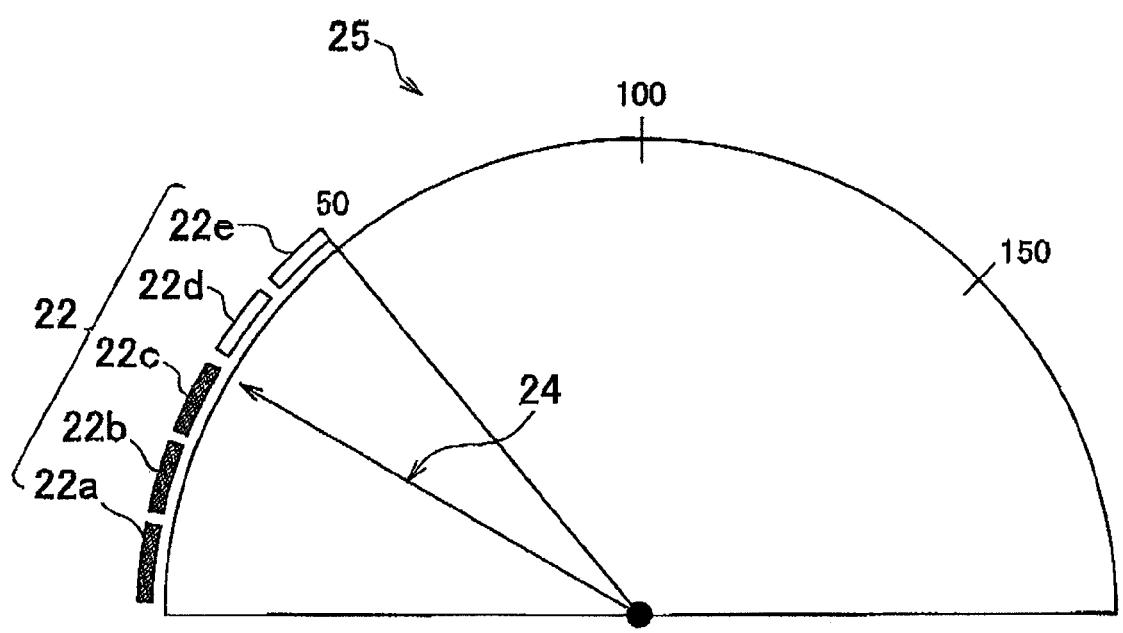
FIG. 6 is a diagram showing an example of a method of displaying an Eco Zone.

FIG. 6 is a diagram showing an example of an Eco Zone display method, schematically illustrating the display section 25 within the meter. The display section 25 within the meter includes an indicator 22 made up of the five LEDs 22*a* to 22*e* for displaying the Eco Zone, and a pointer 24 pointing to the current power. It should be noted that the position pointed to by the pointer 24 (the angle of the pointer 24 in this example) is determined based on a current power signal supplied as required from the EHV-ECU 30. Further, the Eco Zone is an abbreviation of an Economical Zone, which indicates that environmentally-friendly, energy-saving driving is being realized.

In the example shown in FIG. 6, the five LEDs 22*a* to 22*e* are provided for intervals of 10 kW over a range of 0 to 50 kW. That is, the LED 22*a* is for a range of 0 kW to 10 kW, and the LED 22*b* is for a range of 1 to 20 kW. A state in which only the LED 22*a* is turned on means that the Eco Zone falls within the range of 0 to 10 kW, and a state in which only the LEDs 22*a* and 22*b* are turned on means that the Eco Zone falls within the range of 10 to 20 kW. The same applies to the subsequent LEDs.

The meter ECU 20 controls the lighting of the five LEDs 22*a* to 22*e* based on the Eco Zone upper limit threshold calculated in the manner as described above. The meter ECU 20 turns on the LED 22*a* when the Eco Zone upper limit threshold is greater than 0 kW, and turns off the LED 22*a* if the sum of the Eco Zone upper limit threshold and 0.5 kW is smaller than 0 kW. Also, the meter ECU 20 turn on the LED 22*b* if the Eco Zone upper limit threshold is greater than 11 kW, and turns off the LED 22*b* if the sum of the Eco Zone upper limit threshold and 0.5 kW is smaller than 11 kW. Further, the meter ECU 20 turns on the LED 22*c* if the Eco Zone upper limit threshold is greater than 21 kW, and turns off the LED 22*c* if the sum of the Eco Zone upper limit threshold and 0.5 kW is smaller than 21 kW. Further, the meter ECU 20 turns on the LED 22*d* if the Eco Zone upper limit threshold is greater than 31 kW, and turns off the LED 22*d* if the sum of the Eco Zone upper limit threshold and 0.5 kW is smaller than 31 kW. Further, the meter ECU 20 turns on the LED 22*e* if the Eco Zone upper limit threshold is greater than 41 kW, and turns off the LED 22*e* if the sum of the Eco Zone upper limit threshold and 0.5 kW is smaller than 41 kW.

In the example shown in FIG. 6, only the LEDs 22*a*, 22*b*, and 22*c* are turned on to inform the driver that the range of 0 to 30 kW is the Eco Zone. Also, in the example shown in FIG. 6, the pointer 24 points to approximately 30 kW, so the driver can readily understand that the current power is approximately 30 kW and this represents the upper limit value of the Eco Zone. The driver can thus bear in mind to drive the vehicle in such a way that the Eco Zone can be maintained by reducing (or at least maintaining) the current accelerator depression amount. The eco driving (energy-saving driving) can be thus effectively promoted.

It should be noted that the Eco Zone display method is not limited to the method of changing the lighting of the plurality of LEDs 22*a* to 22*e* as shown in FIG. 6. Other conceivable Eco Zone display methods include, in addition to changing the number of LEDs, turning a single lamp (eco lamp) ON/OFF based on whether the current power exceeds the Eco Zone upper limit threshold, and changing the color of a single lamp (eco lamp) based on whether the current power exceeds the Eco Zone upper limit threshold.

The above-described energy-saving driving promotion system 10 according to this embodiment provides, the following advantages.

By varying the method of calculating an Eco Zone upper limit threshold between the normal driving mode and the acceleration/hill-climbing mode as described above, it is possible to display an appropriate Eco Zone in accordance with the current driving mode. Therefore, in situations where acceleration driving is performed, it is possible to display an appropriate Eco Zone within which an acceleration is allowed.

In the first embodiment described above, the "vehicle state detecting device" in the appended claims is implemented by each of the ECUs 30, 40, and 50 (and various kinds of sensors connected to the respective ECUs). The "current value calculating device" in the claims is implemented by the EHV-ECU 30. The "recommended value calculating device" in the claims is implemented by the meter ECU 20 executing the above-described Eco Zone upper limit value calculating process. The "acceleration intention determining device" in the claims is implemented by the meter ECU 20 executing the above-described driving mode determining process. The "indicator device" in the claims is implemented by the display section 25 (the LEDs 22*a*, 22*b*, and 22*c*, and the pointer 24). The "storage device" in the claims is implemented by the memory 21. The "uphill driving determining device" and the "overtaking drive determining device" in the claims are implemented by the meter ECU 20 in association with the above-described driving mode determining process. It should be noted, however, that the current value calculating device, the recommended value calculating device, the acceleration intention determining device, and the like, may each be implemented by another ECU, or by cooperation of two or more ECUs.

In the following, a description will be given of a case where the energy-saving driving promotion system according to this embodiment is configured for a hybrid vehicle. As in the first embodiment, the energy-saving driving promotion system includes the ECUs 20, 30, 40, and 50. The connection arrangement of the ECUs 20, 30, 40, and 50 in the second embodiment itself may be the same as that of the first embodiment, and the second embodiment mainly differs from the first embodiment in the function (software) of the meter ECU 20. In the following, the functions unique to the second embodiment will be described while attaching the same reference numerals as those of the first embodiment to respective components.

In the second embodiment, the display section 25 is formed by a single lamp (hereinafter, referred to as the "eco lamp"), and is arranged within the meter, for example. The status of the eco lamp is controlled by the meter ECU 20. Here, when the eco lamp is turned on, this means that eco driving (energy-saving driving) is being executed, and when the eco lamp is turned off, this means that eco driving is not being executed.

Figure 7A:
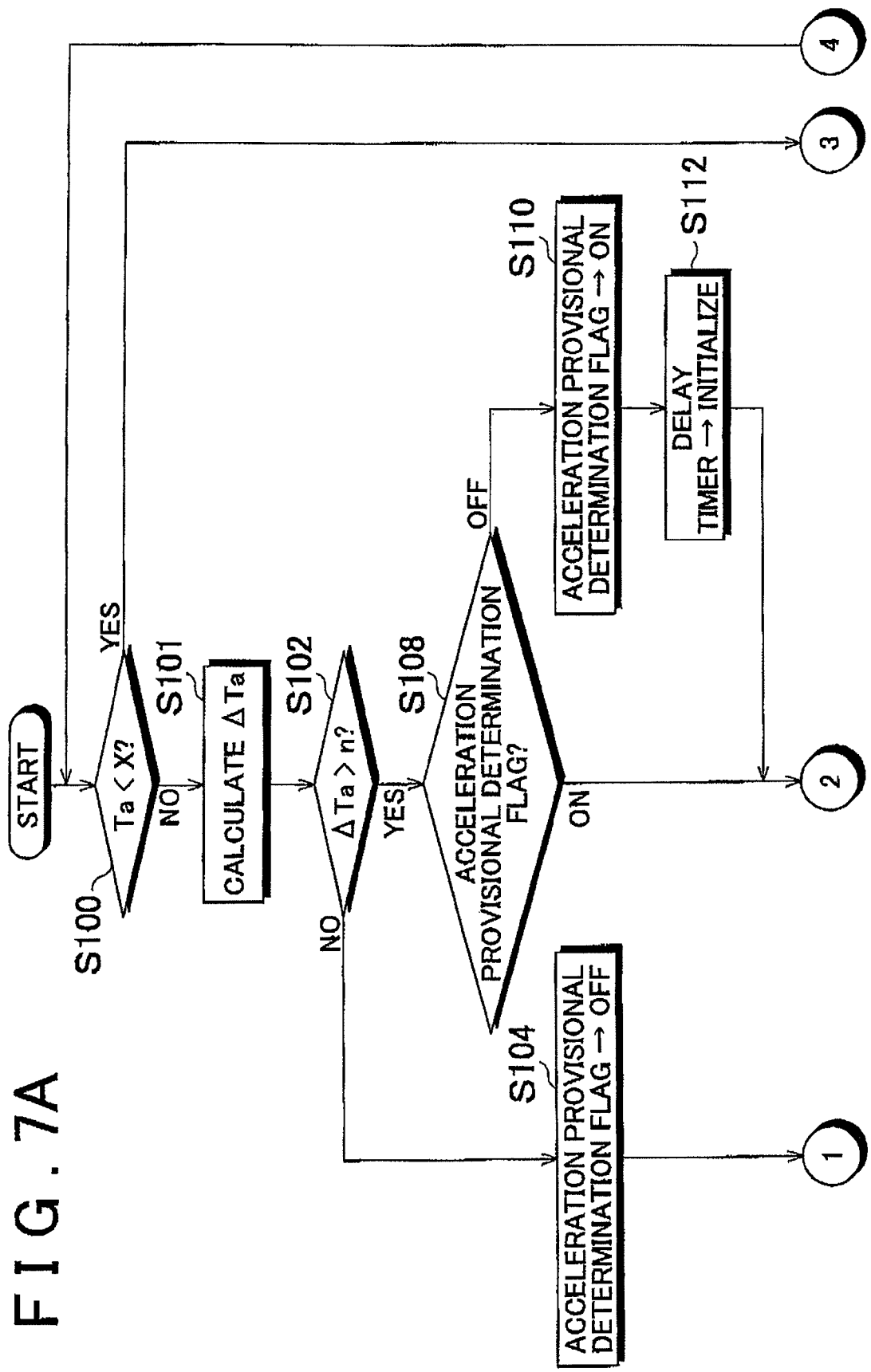

FIG. 7A and FIG. 7B are flowcharts showing main processes executed by the meter ECU 20 of the energy-saving driving promotion system 101 according to the second embodiment. The process routine shown in FIG. 7A and FIG. 7B is repeatedly executed at predetermined intervals while the ignitions switch is ON, for example. Further, the latest vehicle state signal and current power signal are also input to the meter ECU 20 at predetermined intervals.

In Step 100, based on the input vehicle state signal, the meter ECU 20 calculates an acceleration opening Ta in the present cycle, and determines whether the accelerator operation amount Ta is below a predetermined value X. The predetermined value X corresponds to an accelerator operation amount that is small enough to be determined as indicating no intention to accelerate. While the accelerator operation amount Ta may be the value of an output from the accelerator operation amount sensor itself, preferably, the accelerator operation amount Ta is equal to ACC_fil after filtering, as in the first embodiment. If the accelerator operation amount Ta is below the predetermined value X, the process advances to Step 124. Otherwise, the process advances to Step 101.

In Step 101, based on the input vehicle state signal, the meter ECU 20 calculates a rate of change ΔTa [%/sec] of the accelerator operation amount Ta, and the process advances to Step 102. The accelerator operation amount change rate ΔTa may be calculated as follows, for example, using the present value Ta(k) and previous value Ta(k−1) of the accelerator operation amount, and a sampling cycle Δt of the accelerator operation amount:

$$\Delta Ta = \{Ta(k) - Ta(k-1)\}/\Delta t$$

In Step 102, the meter ECU 20 determines whether the accelerator operation amount change rate ΔTa calculated in Step 101 exceeds a predetermined value n. The predetermined value n corresponds an accelerator operation amount change rate that may be determined as indicating that the driver may possibly intend to accelerate. For example, the predetermined value n is determined as such a value that can detect the initial phase of an accelerator work in which the driver slowly (gradually) increases depression of the accelerator pedal. If the accelerator operation amount change rate ΔTa exceeds the predetermined value n, the process advances to Step 108. Otherwise, the process advances to Step 104.

In Step 104, the meter ECU 20 turns a provisional acceleration determination flag OFF, and the process advances to Step 106.

In Step 106, the meter ECU 20 does not change the lighting mode, and the process advances to step 128. Here, the lighting mode includes three modes: A mode, B mode, and C mode. The initial value of the lighting mode is set as the A mode. While the lighting control is executed in different manners in respective modes, a description in this regard will be given later in association with Step 128 described later.

In Step 108, the meter ECU 20 determines the status of the acceleration provisional determination flag. If the acceleration provisional determination flag is ON, the process advances to Step 114, and if the acceleration provisional determination flag is OFF, the process advances to Step 110.

In Step 110, the meter ECU 20 turns the acceleration provisional determination flag ON, and the process advances to Step 112.

In Step 112, the meter ECU 20 initializes a delay timer (or a counter), and the process advances to Step 114. Accordingly, the delay timer starts counting from zero.

In Step 114, the meter ECU 20 determines whether the lighting mode is the mode B. If the lighting mode is the mode B, the process advances to Step 122, and if the lighting mode is a mode other than the mode B, the process advances to Step 116.

In Step 116, the meter ECU 20 determines whether the accelerator operation amount change rate ΔTa calculated in Step 101 exceeds a predetermined value m. The predetermined value m is larger than the above-described predetermined value n used in the determination in Step 102 mentioned above (that is, m>n). The predetermined value m is an accelerator operation amount change rate that indicates the driver intends to accelerate.

If the accelerator operation amount change rate ΔTa exceeds the predetermined value m, it is determined that the vehicle is accelerating (acceleration determination flag turns ON), and the process advances to Step 122. Otherwise, the process advances to Step 118.

In Step 118, the meter ECU 20 determines whether the value of the delay timer is below a predetermined value Td. The predetermined value Td is a period of time longer than the time required for the acceleration determination flag to turn ON after the acceleration provisional determination flag turns ON when the driver slowly (gradually) increases depression of the accelerator pedal. For example, the predetermined value Td may be adapted based on the time series data (test data) of the accelerator operation amount in a case when the driver slowly increases depression of the accelerator pedal. If the value of the delay timer is below the predetermined value Td [sec], the process advances to Step 120. Otherwise, the process advances to Step 126.

In Step 120, the meter ECU 20 sets the lighting mode to the C mode, and the process advances to Step 128.

In Step 122, the meter ECU 20 sets the lighting mode to the B mode, and the process advances to Step 128.

In Step 124, the meter ECU 20 turns the acceleration provisional determination flag OFF, and the process advances to Step 126.

In Step 126, the meter ECU 20 sets the lighting mode to the A mode, and the process advances to Step 128.

In Step 128, the meter ECU 20 executes lighting control of the eco lamp according to the current lighting mode, and returns to Step 100 of the next cycle.

Hereinafter, a detailed description will be given of lighting control according to the lighting mode in Step 128 mentioned above.

Figure 8:
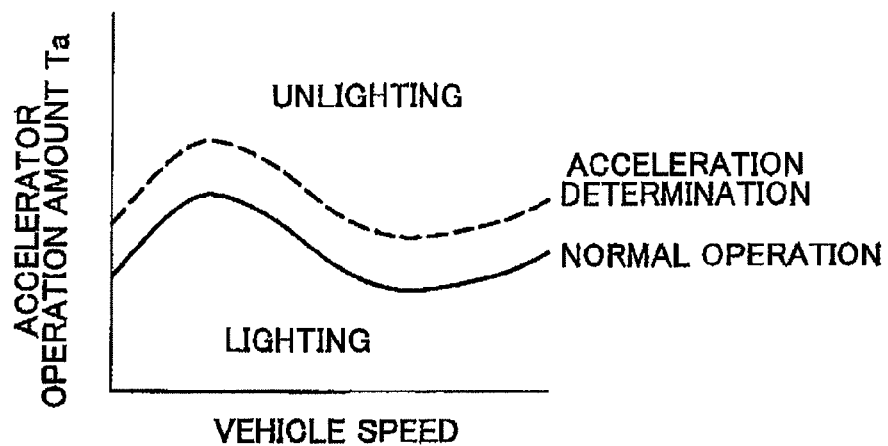
FIG. 8 is a diagram showing an example of a normal operation map and an acceleration operation map.

FIG. 8 is a diagram showing an example of a normal operation map and an acceleration operation map. The normal operation map and the acceleration operation map are stored in the memory 21. FIG. 8 shows two threshold curves with the vehicle speed taken on the horizontal axis and the accelerator operation amount Ta on the vertical axis. A first threshold curve (solid line) constitutes the normal operation map, and a second threshold curve (dotted line) constitutes the acceleration operation map. The upper-side region divided by each threshold curve is an unlighting region, and the lower-side region divided by each of the threshold curves is a lighting region. The meter ECU 20 turns on the eco lamp if the plot point of the detected values of the accelerator operation amount Ta and vehicle speed falls within the lighting region, and turns off the eco lamp if the plot point of the detected values of the accelerator operation amount Ta and vehicle speed falls within to the unlighting region.

If the current lighting mode is the A mode, the meter ECU 20 executes lighting control of the eco lamp using the normal operation map (first threshold curve). If the current lighting mode is the B mode, the meter ECU 20 executes lighting control of the eco lamp using the acceleration operation map (second threshold curve). As shown in FIG. 8, in the second threshold curve, the accelerator operation amount Ta corresponding to the same vehicle speed is larger than that in the first threshold curve. That is, when using the acceleration operation map, a larger accelerator operation amount Ta than that in the case of using the normal operation map is employed as a threshold. Therefore, when the current lighting mode is the B mode, as compared with a case when the current lighting mode is the A mode, the eco lamp remains on until a larger accelerator operation amount Ta is detected for a given vehicle speed. That is, in driving situations where acceleration driving is performed, the threshold at which acceleration is allowed is employed as a recommended accelerator operation amount.

When the current lighting mode is the C mode, the meter ECU 20 maintains the current status of the eco lamp regardless of the vehicle speed and accelerator operation amount Ta. Therefore, when the eco lamp is turned on, the eco lamp remains on even when the plot point of the vehicle speed and accelerator operation amount Ta belongs to the unlighting region.

Now, referring to FIGS. 9 and 10, the technical meaning of the C mode will be described.

Figure 9:
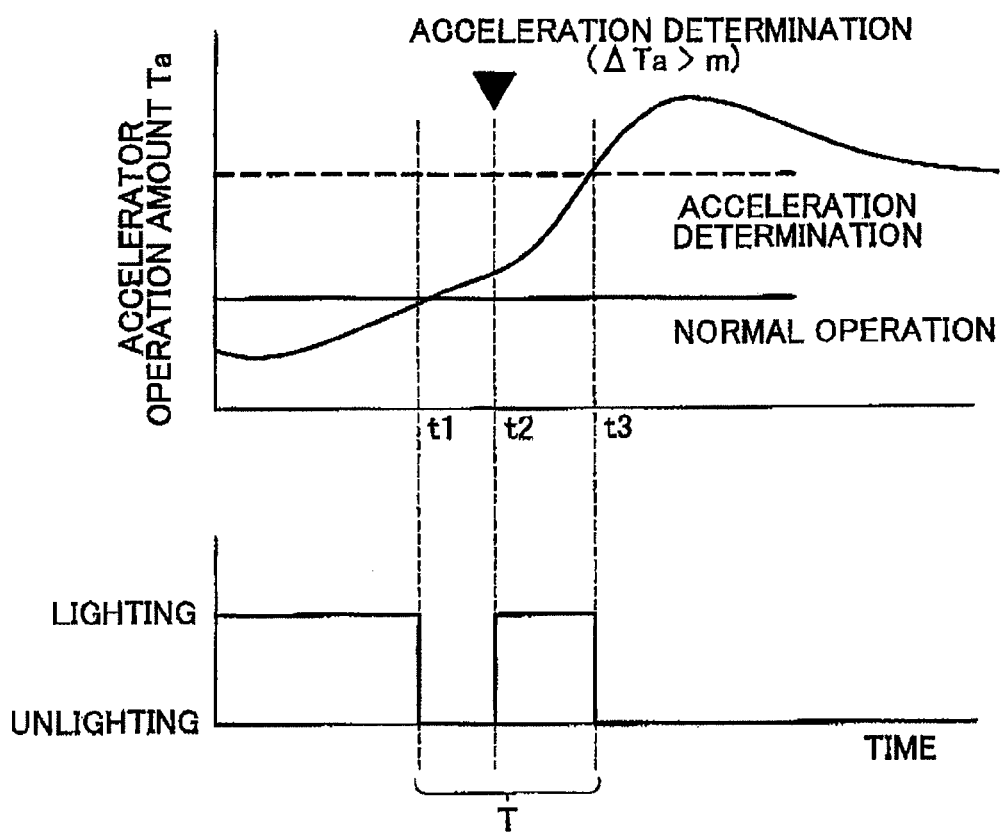
FIG. 9 is a diagram showing an example of the lighting control of an eco lamp according to a comparative example as opposed to the second embodiment.

FIG. 9 is a diagram showing an example of the lighting control of the eco lamp according to a comparative example, illustrating an example of lighting control of the eco lamp in a case where the above-described C mode is not provided. The upper column of FIG. 9 shows an example of the time series of the accelerator operation amount Ta, and the lower column shows the status of the eco lamp with respect to the time series of the accelerator operation amount Ta. In the time series of the accelerator operation amount Ta shown in FIG. 9, the driver slowly increases depression of the accelerator pedal up to the vicinity of time t2, and the driver rapidly increases depression of the accelerator pedal after time t2.

It should be noted that in the comparative example, the normal operation map is used when the accelerator operation amount change rate ΔTa is below the predetermined value m, and when the accelerator operation amount change rate ΔTa exceeds the predetermined value m, it is determined that the vehicle is accelerating, and the acceleration operation map is used.

In the comparative example shown in FIG. 9, at time t1, the accelerator operation amount Ta exceeds the threshold based on the normal operation map, so the eco lamp is turned off. Further, at time t2, the accelerator operation amount change rate ΔTa exceeds the predetermined value m, so it is determined that the vehicle is accelerating. Accordingly, the map that is used switches from the normal operation map to the acceleration operation map (the mode transitions from the mode A to the mode B). Because the threshold based on the acceleration operation map is higher than the threshold based on the normal operation map at any given vehicle speed, when the map is switched to the acceleration operation map, the threshold becomes abruptly higher. Therefore, if the map that is used switches from the normal operation map to the acceleration operation map, there is a possibility that the accelerator operation amount Ta that should exceed the threshold in the case of the normal operation map may fall below the threshold based on the acceleration operation map. In the comparative example shown in FIG. 9, at time t2, the accelerator operation amount Ta falls below the threshold based on the acceleration operation map, so the eco lamp is turned on. Thereafter, at time t3, the accelerator operation amount Ta exceeds the threshold based on the acceleration operation map, so the eco lamp is turned off.

Figure 10:
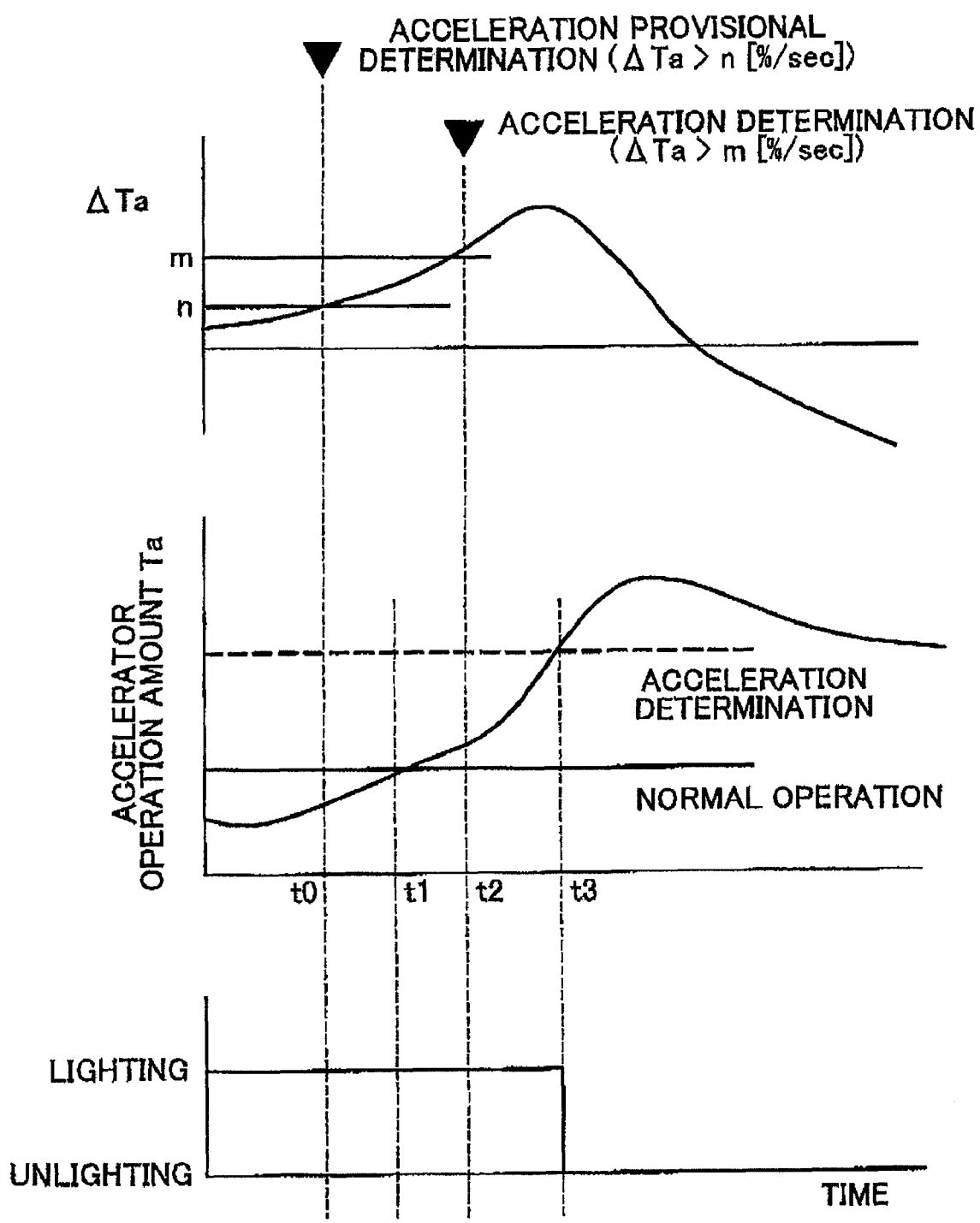
FIG. 10 is a diagram showing an example of the lighting control of the eco lamp according to the second embodiment.

FIG. 10 shows an example of lighting control of the eco lamp according to this embodiment. The upper column of FIG. 10 shows an example of the time series of the accelerator operation amount change rate ΔTa, the middle column shows an example of the time series of the accelerator operation amount Ta, and the lower column shows the status of the eco lamp with respect to the time series of the accelerator operation amount Ta. The time series of the accelerator operation amount Ta is the same as the time series shown in FIG. 9.

According to this embodiment shown in FIG. 10, at time to, the accelerator operation amount change rate ΔTa exceeds the predetermined value n, and the acceleration provisional determination flag turns ON (the mode transitions from the mode A to the mode C). Accordingly, the delay timer is initialized, and thereafter, the C mode is maintained for the predetermined period of time Td [sec] under a fixed condition. Therefore, although in the example shown in FIG. 10 as well the accelerator operation amount Ta exceeds the threshold based on the normal operation map at time t1, because the current mode is the C mode, the eco lamp remains on. Further, at time t2, the accelerator operation amount change rate ΔTa exceeds the predetermined value m, so it is determined that the vehicle is accelerating. Accordingly, the map that is used switches from the normal operation map to the acceleration operation map (the mode transitions from the mode C to the mode B). At this time, the accelerator operation amount Ta is below the threshold based on the acceleration operation map, so the eco lamp still remains on. Thereafter, at time t3, the accelerator operation amount Ta exceeds the threshold based on the acceleration operation map, so the eco lamp is turned off.

In the comparative example shown in FIG. 9, as shown in the lower column of FIG. 9, as the driver slowly (gradually) increases depression of the accelerator pedal, the eco lamp turns off at time t1, and at time t2 immediately thereafter, the eco lamp is turned on. Such blinking of the eco lamp may confuse the driver and may make it difficult for the driver to understand what the blinking status of the eco lamp means.

In contrast, according to this embodiment, if it is determined that the driver may intend to accelerate (when the acceleration determination flag is ON), the status of the eco lamp remains unchanged for the predetermined period of time Td, except for when the condition for transition to the mode A is met or the accelerator operation amount change rate ΔTa exceeds the predetermined value m. Therefore, as shown in the lower column of FIG. 10, the eco lamp does not blink even if the driver gradually increases depression of the accelerator pedal. That is, the eco lamp remains on unless the accelerator operation amount change rate ΔTa exceeds the predetermined value m. Thus, according to this embodiment, blinking of the eco lamp due to gradual increases in the depression of the accelerator pedal is avoided, thereby making it possible to execute lighting control of the eco lamp that the driver may easily understand.

In the second embodiment, the "vehicle state detecting device" in the appended claims is implemented by each of the ECUs 30, 40, and 50 (and various kinds of sensors connected to the respective ECUs). The "current value calculating device" in the claims is implemented by the meter ECU 20 calculating (acquiring) the accelerator operation amount Ta. The "recommended value calculating device" in the claims is implemented by the meter ECU 20 calculating the above-described threshold corresponding to the vehicle speed. The "acceleration intention determining device" in the claims is implemented by the meter ECU 20 executing the process of Step 116 in FIG. 7B. The "indicator device" in the claims is implemented by the eco lamp. Further, the "index value calculating device" in the claims is implemented by the meter ECU 20 executing the process of Step 101 in FIG. 7A. The "provisional determination device" in the claims is implemented by the meter ECU 20 executing the processes of Steps 102 and 110 in FIG. 7A. It should be noted, however, that the current value calculating device, the recommended value calculating device, the acceleration intention determining device, and the like, may each be implemented by another ECU, or by cooperation of two or more ECUs. Further, an element of the vehicle state detecting device may be implemented by the same electronic part (ECU or sensor) as the current value calculating device, as with the accelerator operation amount sensor in this embodiment.

While example embodiments of the present invention have been described above in detail, the present invention is not limited to the described embodiments. Various modifications and substitutions may be applied to the above-described embodiments without departing from the scope of the present invention.

For example, while a recommended value (Eco Zone upper limit threshold) relating to a vehicle drive power is calculated as a recommended value in the first embodiment, a recommended value relating to an accelerator operation amount may be used instead. Conversely, while an accelerator operation amount is calculated as a recommended value in the second embodiment, a recommended value relating to a vehicle drive power may be used instead.

Further, in the second embodiment described above, the acceleration determination and provisional acceleration determination are made using a single parameter (accelerator operation amount change rate ΔTa). However, the acceleration determination and provisional acceleration determination may be made using two or more parameters as in the first embodiment.

What is claimed is:

1. An energy-saving driving promotion system comprising:
    a vehicle state detecting device configured to detect a vehicle state;
    a current value calculating device configured to calculate a current value associated with an accelerator operation amount or a vehicle drive power, based on the detected vehicle state;
    a recommended value calculating device configured to calculate a recommended value associated with the accelerator operation amount or the vehicle drive power, based on the detected vehicle state;
    an indicator device configured to indicate a relationship between the calculated recommended value and the calculated current value; and
    an acceleration intention determining device configured to determine whether a driver intends to accelerate, based on the detected vehicle state,
    wherein if the acceleration intention determining device determines that the driver intends to accelerate, the recommended value calculating device calculates a larger recommended value when the acceleration intention determining device determines that the driver intends to accelerate than when the acceleration intention determining device determines that the driver does not intend to accelerate,
    the energy-saving driving promotion system, further comprising:
    an index value calculating device configured to calculate an index value indicating a driver's intention to accelerate based on the detected vehicle state,
    wherein the acceleration intention determining device determines that the driver intends to accelerate if the index value calculated by the index value calculating device exceeds a predetermined first threshold,
    wherein the indicator device is a lamp of which an on-off state changes when the calculated current value exceeds the calculated recommended value,
    wherein there is further provided a provisional determination device configured to provisionally determine that the driver intends to accelerate if the index value calculated by the index value calculating device exceeds a second threshold that is smaller than the first threshold, and
    wherein if the provisional determination device provisionally determines that the driver intends to accelerate, the on-off state of the lamp remains in a current state for a predetermined period of time.

2. The energy-saving driving promotion system according to claim 1, wherein even if the provisional determination device provisionally determines that the driver intends to accelerate, the on-off state of the lamp changes if, within the predetermined period of time, the acceleration intention determining device determines that the driver intends to accelerate, and the current value exceeds the recommended value that is calculated by the recommended value calculating device when it is determined that the driver intends to accelerate.

* * * * *